# 2,945,856

2,4,6,8-TETRA-TERTIARYBUTYLPHENOXAZINE

Herbert B. Rickert, Midland, and Werner M. Geiger, Saginaw, Mich., assignors to The Dow Chemical Company, Midland, Mich., a corporation of Delaware No Drawing. Filed Aug. 7, 1958, Ser. No. 753,610

2 Claims. (Cl. 260—244)

The present invention is directed to the novel compound 2,4,6,8-tetra-tertiarybutylphenoxazine and to a method for its preparation. The new compound corresponds to the formula:

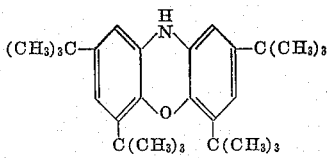

This phenoxazine is a crystalline solid, soluble in many common organic solvents and of very limited solubility in water. It is useful as a parasiticide, and is adapted to be employed in dust and liquid compositions for the control of many mite, insect, and bacterial organisms. The compound has also been found useful as a herbicide for the control of the growth of germinant seeds of small-seeded grasses.

The new compound may be prepared by a process which comprises contacting together 2,4-ditertiarybutyl-6-nitrophenol, glacial acetic acid, and finely divided zinc. The process is exothermic and takes place smoothly in the temperature range of from 60° to 125° C. with the formation of the desired product. Reaction temperatures may be controlled by external heating or cooling, or by regulating the rate of contacting of the reactants. Good results are obtained when employing the reactants in the proportions of at least about 2 gram atoms of zinc and about 10 gram molecules of glacial acetic acid for each gram molecule of nitrophenol reactant to be employed.

In carrying out the reaction, the nitrophenol reactant is dispersed in the glacial acetic acid reaction medium. The dispersing may be carried out at room temperature or the like. Upon completion of the dispersing, finely divided zinc is added to the acid mixture slowly, portionwise, and with stirring. Stirring is thereafter continued and the mixture is maintained for a time at temperatures in the process temperature range which may be the autogenous process temperature, to ensure completion of the reaction. Upon completion of the reaction, a 2,4,6,8-tetra-tertiarybutylphenoxazine product may be separated; in one method, by cooling the mixture and diluting with water whereupon the desired phenoxazine product precipitates as a crystalline solid. This product may then be removed by filtration, decantation, or the like, and may thereafter be purified in such manners as recrystallization from a solvent.

The following examples illustrate the invention but are not to be construed as limiting:

Example 1

Zinc dust (21 grams; 0.31 gram-atom) was added over a period of about 15 minutes to 25 grams (0.10 mole) of 2,4-ditertiarybutyl-6-nitrophenol dispersed in 200 milliliters of glacial acetic acid. During the addition, the temperature spontaneously rose from approximately 25° C. to approximately 100° C. Thereafter the mixture slowly cooled to room temperature, whereupon a 2,4,6,8-tetra-tertiarybutylphenoxazine product precipitated therein as a crystalline solid. This product was separated by filtration, washed with hot water, and recrystallized from acetone. The recrystallized 2,4,6,8-tetra-tertiarybutylphenoxazine product melted at 188° C. and was found by analysis to have contents of carbon, hydrogen and nitrogen of 81.87, 9.47, and 3.49 percent by weight, respectively, as compared to theoretical contents of 82.5, 10.1, and 3.44 percent, respectively.

Example 2

Zinc dust (40 grams; 0.62 gram-atom) was added over a period of 19 minutes to 40 grams (0.16 mole) of 2,4-ditertiarybutyl-6-nitrophenol dispersed in 630 milliliters of glacial acetic acid. During the first few minutes of the addition, the temperature of the mixture rose from approximately 27° C. to approximately 54° C. The temperature of the resulting reaction mixture was then slowly raised over a period of 50 minutes to approximately 115° C., and was thereafter heated at the boiling temperature (approximately 120° C.) and under reflux for 16 minutes, and then cooled and filtered. The filtrate was diluted with 1500 milliliters of water, whereupon a 2,4,6,8-tetra-tertiarybutylphenoxazine product precipitated in the reaction mixture as a crystalline solid. This precipitate was removed by filtration and dried, and the dried product thereafter recrystallized from petroleum ether to obtain a purified 2,4,6,8-tetra-tertiarybutylphenoxazine product. 2,4,6,8-tetra-tertiarybutylphenoxazine has a molecular weight of 407.6.

The novel phenoxazine compound is useful as a parasiticide, and as a seedicide for the control of the germinant seeds of small-seeded grasses. For such use, the compound may be used directly. Alternatively, it may be dispersed upon an inert finely divided solid and the resulting preparation employed as a dust. Also, such preparations may be dispersed in water with or without a wetting agent and the resulting aqueous suspensions used as sprays. In other procedures the compound may be employed in oil or as a constituent of oil-in-water or water-in-oil emulsions or as aqueous dispersions thereof which may be applied as a spray, drench, or wash. In a representative operation, the application as a wetting spray of an aqueous dispersion containing the present compound as sole toxicant at the rate of 1 pound per 100 gallons of ultimate composition to a population of two-spotted spider mites parasitic upon young bean plants resulted in a practically complete kill of the mites without evident injury to the bean plants.

We claim:
1. 2,4,6,8-tetra-tertiarybutylphenoxazine.
2. A method of preparing 2,4,6,8-tetra-tertiarybutylphenoxazine which comprises the step of contacting zinc and 2,4-di-tertiarybutyl-6-nitrophenol dispersed in glacial acetic acid in the temperature range of 60° C. to 125° C.

References Cited in the file of this patent

FOREIGN PATENTS 268,089    Switzerland _____ Aug. 1, 1950

OTHER REFERENCES

Elderfield: Heterocyclic Compounds, vol. 6, p. 696 (1957).